(12) United States Patent
Horejsi et al.

(10) Patent No.: US 6,443,836 B1
(45) Date of Patent: Sep. 3, 2002

(54) APPARATUS FOR LIFTING AND LATERALLY SUPPORTING A COTTON RECEIVING BASKET OF A COTTON HARVESTER

(75) Inventors: Michael J. Horejsi, Sherrard, IL (US); Travis A. Schaeffer, Davenport, IA (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/847,471

(22) Filed: May 2, 2001

Related U.S. Application Data

(60) Provisional application No. 60/260,513, filed on Jan. 9, 2001.

(51) Int. Cl.$^7$ .................................................. A01F 12/60
(52) U.S. Cl. ........................ 460/119; 56/16.6; 414/345
(58) Field of Search ............................... 414/345, 346, 414/347, 495, 470, 519, 502, 505; 56/16.6, 28, 30, 203, 214, DIG. 11; 460/119

(56) References Cited

U.S. PATENT DOCUMENTS

| | | | |
|---|---|---|---|
| 2,656,216 A | 10/1953 | Bobroff | 296/137 |
| 3,160,436 A | 12/1964 | Duddleston | 296/105 |
| 3,732,672 A | 5/1973 | Adee et al. | 56/13.3 |
| 4,362,457 A | * 12/1982 | Taylor et al. | 414/345 |
| 4,519,189 A | 5/1985 | Fachini et al. | 56/16.6 |
| 4,520,617 A | * 6/1985 | Fachini et al. | 56/16.6 |
| 5,065,569 A | 11/1991 | Schlueter | 56/16.6 |
| 5,338,140 A | * 8/1994 | Ekdahl et al. | 414/346 |
| 5,407,390 A | 4/1995 | Carney et al. | 460/119 |
| 5,484,337 A | 1/1996 | Robinson et al. | 460/119 |
| 5,556,338 A | 9/1996 | Covington | 460/119 |
| 5,616,077 A | 4/1997 | Covington et al. | 460/119 |

* cited by examiner

*Primary Examiner*—Robert E. Pezzuto
*Assistant Examiner*—Árpád F Kovács
(74) *Attorney, Agent, or Firm*—John William Stader; Larry W. Miller

(57) ABSTRACT

Apparatus for lifting a cotton receiving basket of a cotton harvester above a frame thereof including a plurality of upstanding fluid lift cylinders disposed at spaced locations around the basket, each of the lift cylinders has a cylinder body including an outer surface having a vertical extent at least equal to a maximum height that the basket is to be lifted above the frame, each of the cylinder bodies being fixedly mounted to the frame and the cylinders having extendable rods attached to the basket such that when the rods are moved telescopically upwardly the basket is lifted relative to the frame; and at least one lateral support bracket fixedly mounted to the basket and engaged with the outer surface of one of the cylinder bodies for moving therealong in engagement therewith when the basket is lifted for preventing lateral movement of the basket relative to the one of the cylinder bodies.

13 Claims, 4 Drawing Sheets

APPARATUS FOR LIFTING AND LATERALLY SUPPORTING A COTTON RECEIVING BASKET OF A COTTON HARVESTER

This application claims the benefit of U.S. Provisional Application No. 60/260,513, filed Jan. 9, 2001.

TECHNICAL FIELD

The present invention generally relates to cotton harvesters and, more particularly, to apparatus for lifting or raising a cotton receiving basket or receptacle of a cotton harvester relative to a mobile frame thereof, while supporting the basket for preventing lateral movement thereof.

BACKGROUND ART

Modern cotton harvesters include relatively large high volume baskets or receptacles that are supported by a movable frame of the harvester for receiving and holding harvested cotton materials received from cotton harvester row units mounted on the frame.

The basket is typically provided with drivers for moving the basket between an operational or lower position wherein the basket is resting on or close to the frame of the harvester for receiving the cotton from the row units, and an unloading or raised position a distance above the lower position, wherein the cotton collected in the basket can be unloaded to another receptacle or container. Typically, such drivers include two or more fluid cylinders. Each fluid cylinder is typically connected to fluid supply lines connected to a source of pressurized fluid mounted on the harvester, such as a hydraulic pump. Reference in this regard, Fachini et al. U.S. Pat. No. 4,519,189, issued May 28, 1985 to J. I. Case Company; and Covington et al. U.S. Pat. No. 5,616,077, issued Apr. 1, 1997 to Case Corporation, both of which patents disclose well known apparatus for raising and lowering a cotton harvester basket, including a plurality of upright fluid cylinders in combination with mast structures or members for constraining and guiding the vertical movement of the basket, to prevent de-stabilization thereof when elevated.

However, shortcomings of the known mast structures and members for preventing destabilization of the basket include that they add complexity and cost, and it is possible for them to jam if rollers or sliding elements thereof become damaged or rusted.

Accordingly, it would be desirable to provide apparatus for lifting a cotton receiving basket of a cotton harvester, which overcomes the shortcomings discussed above.

SUMMARY OF THE INVENTION

According to the invention, apparatus for lifting a cotton receiving basket of a cotton harvester above a frame thereof, is disclosed. The present apparatus includes a plurality of upstanding fluid lift cylinders disposed at spaced locations around the basket, each of the lift cylinders including an elongate cylinder body having a rod disposed therein and extending upwardly therefrom for longitudinal telescopic movement relative thereto, each of the cylinder bodies including an outer surface having a vertical extent at least equal to a maximum height that the basket is to be lifted above the frame, each of the cylinder bodies being fixedly mounted to the frame and each of the rods being attached to the basket such that when the rods are moved telescopically upwardly the basket is lifted relative to the frame; and at least one lateral support bracket fixedly mounted to the basket and engaged with the outer surface of one of the cylinder bodies for moving therealong in engagement therewith when the basket is lifted for preventing lateral movement of the basket relative to said one of the cylinder bodies.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
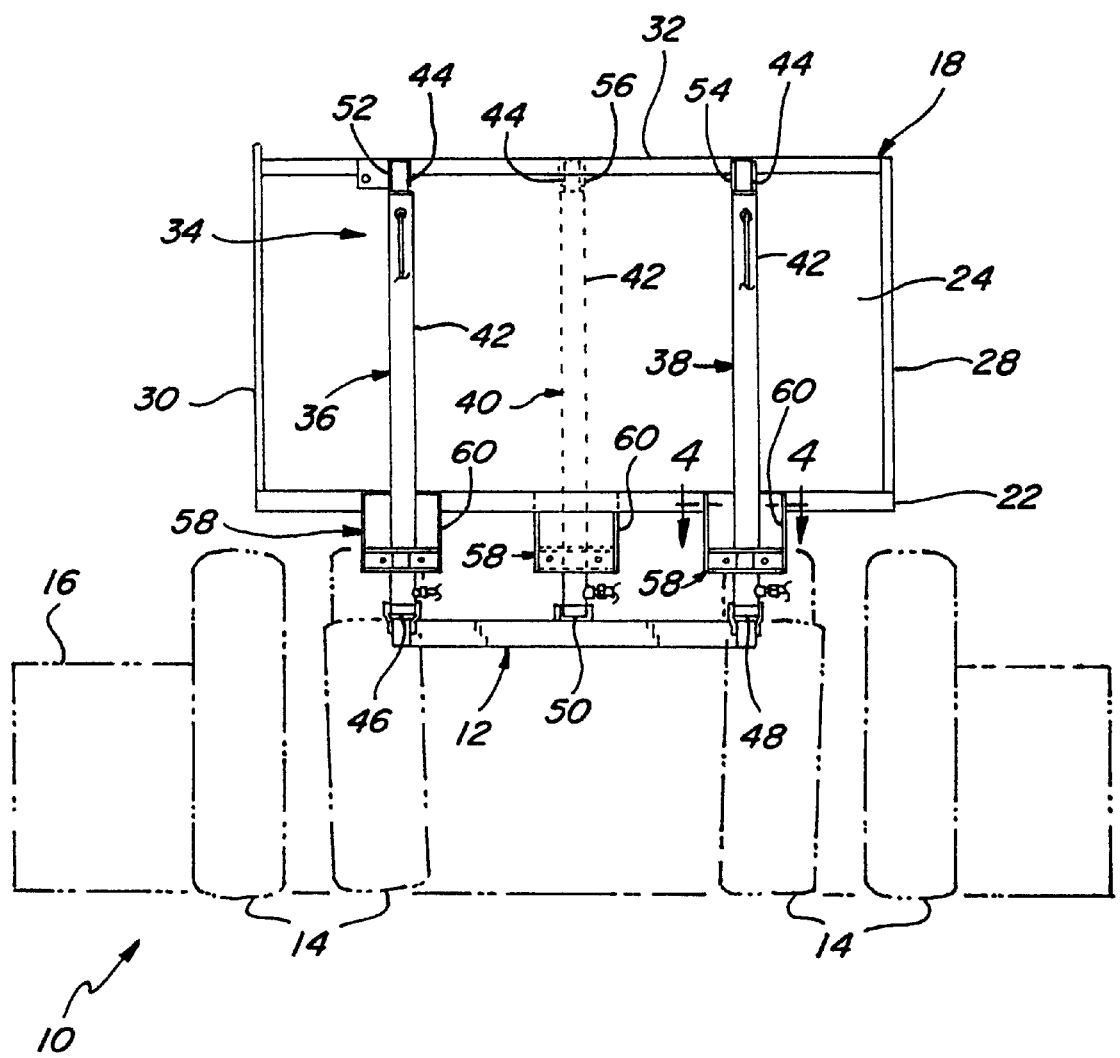
FIG. 1 is a simplified rear elevational view of a cotton harvester including apparatus for lifting a cotton receiving basket thereof according to the present invention.
Figure 2:
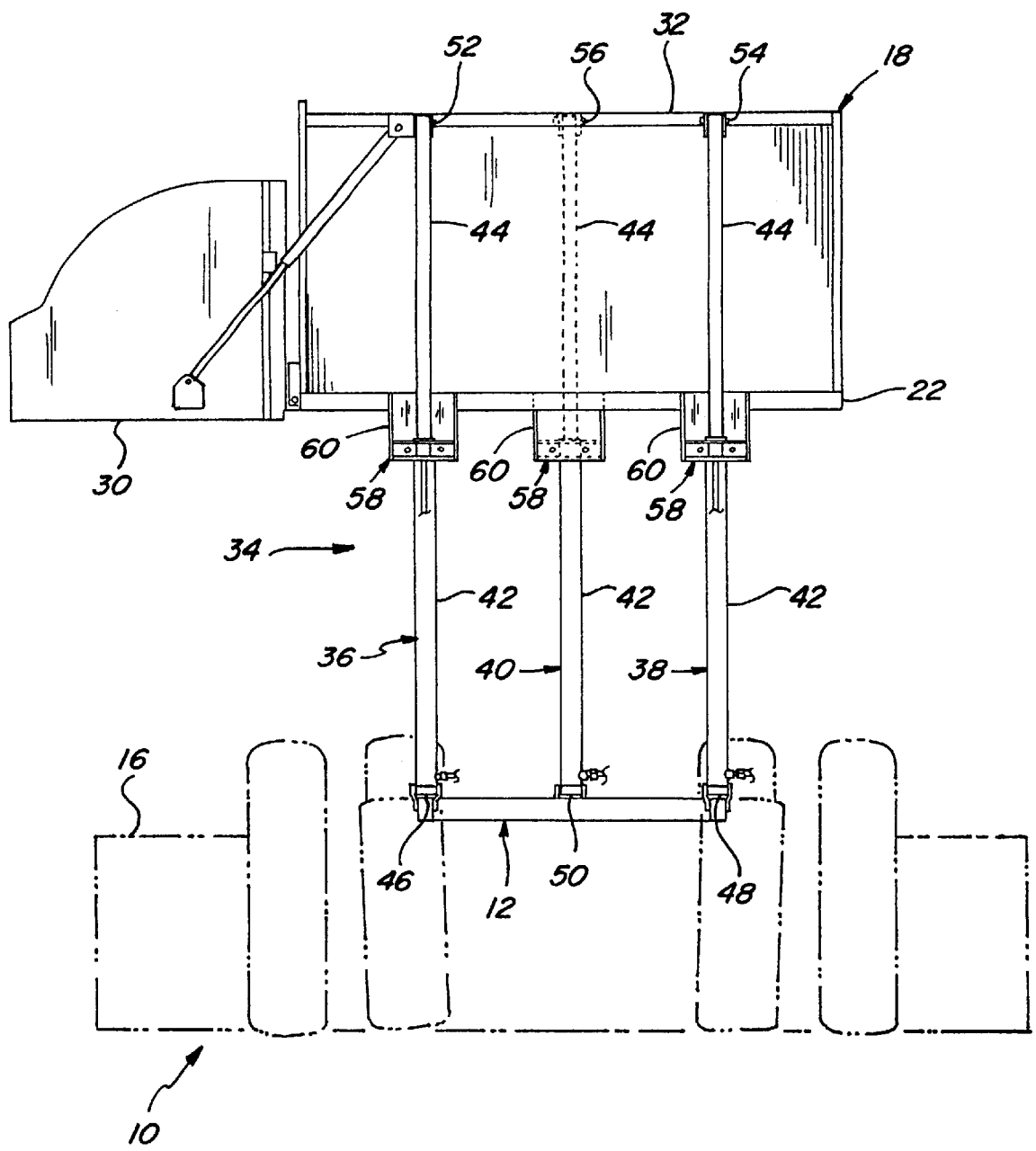
FIG. 2 is another simplified rear elevational view of the cotton harvester of FIG. 1, showing the cotton receiving basket supported by the present apparatus lifted relative to a mobile frame of the harvester.
Figure 3:
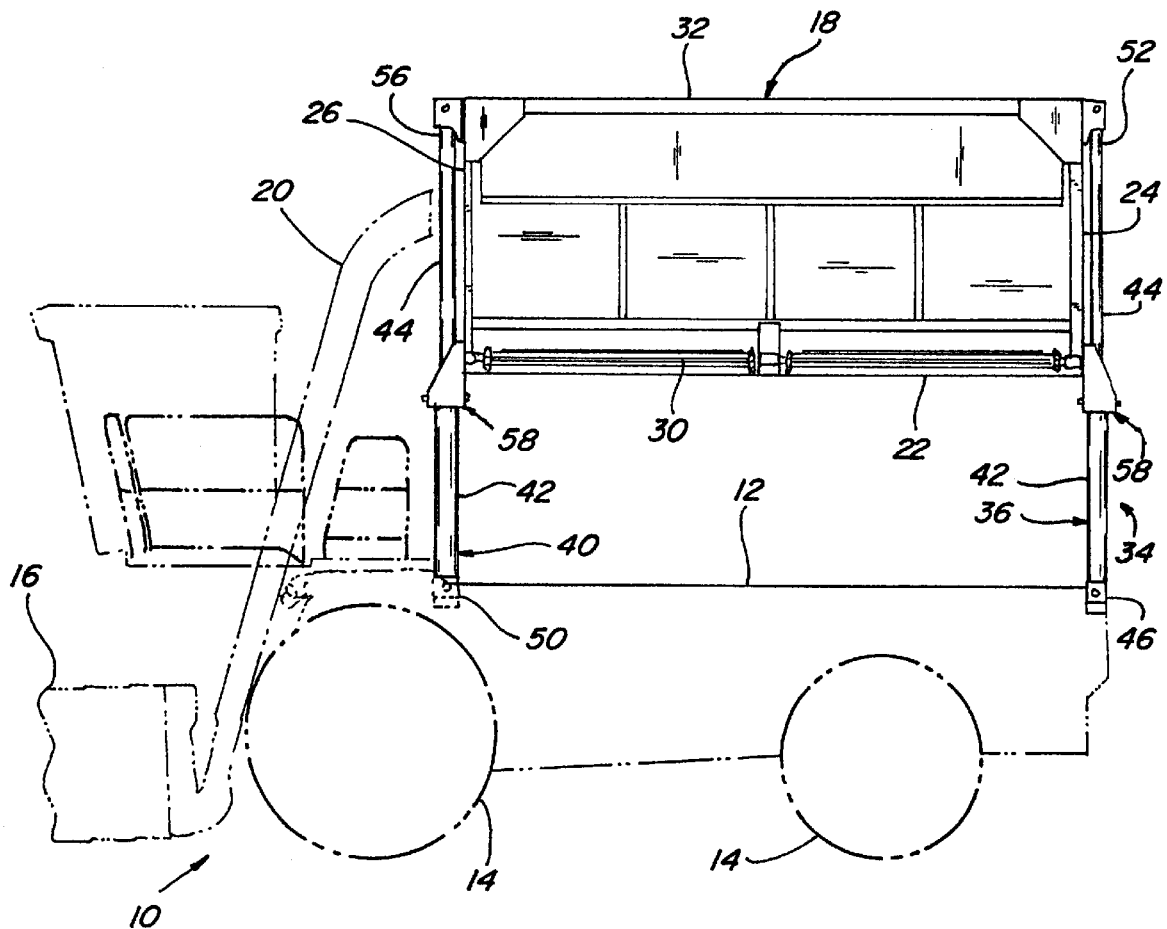
FIG. 3 is a simplified side elevational view of the harvester of FIG. 1 with the basket lifted by the present apparatus.

Referring now to the drawings, in FIGS. 1, 2, and 3, a cotton harvester 10 is shown including a mobile frame 12 supported by a plurality of wheels 14 (in phantom) for movement over the ground for harvesting cotton from cotton plants using a plurality of row units 16 also supported by mobile frame 12, in the well known, conventional manner. Cotton harvester 10 includes a large, rectangular shape basket 18 for receiving and collecting cotton harvested by row units 16, the cotton being blown from row units 16 to basket 18 through a plurality of ducts 20 (FIG. 3) by fans (not shown) in the well known, conventional manner.

Basket 18 includes a rectangular bottom peripheral frame structure 22 around the bottom thereof supporting a basket floor (not shown). A rear wall 24 is attached to frame structure 22 and extends upwardly therefrom at a rear end of basket 18. A front wall 26 is attached to frame structure 22 and extends upwardly therefrom at the front end of basket 18. A side wall 28 is attached to frame structure 22 and extends between rear wall 24 and front wall 26. A door or second side wall 30 is pivotally mounted to frame structure 22 between rear wall 24 and front wall 26 and is movable between an upwardly extending closed position, as shown in FIG. 1, for retaining the cotton in basket 18, and a lowered, open position (FIGS. 2 and 3) for allowing removing and unloading of the cotton from basket 18. Basket 18 includes an upper peripheral frame structure 32 extending around the periphery thereof and connecting walls 24, 26, and 28 together to provide a unitary basket structure. Basket 18 also includes a lid (not shown) which is located in a stored position therein and is telescopically extendable upwardly therefrom to a normal harvesting position.

Cotton harvester 10 includes apparatus 34 for lifting basket 18 vertically or upwardly relative to mobile frame 12 to facilitate unloading or transfer of the cotton collected in basket 18 to another receptacle, such as a well known conventional module builder, a truck, or the like. Apparatus 34 includes a plurality of extendable fluid lift cylinders, preferably three, including a first lift cylinder 36, a second lift cylinder 38, and a third lift cylinder 40, disposed at spaced locations around basket 18. Here, it should be understood that by the term "plurality", it is meant that apparatus 34 can include as few as just two, or any greater number, of the lift cylinders, as required or desired for a particular application. The three lift cylinders 36, 38, and 40 shown in the present embodiment, and the locations thereof, have been selected as they provide satisfactory lifting capability and stability for basket 18, as will be explained.

Each of the lift cylinders 36, 38, and 40 includes an elongate, cylindrical cylinder body 42 having an elongate rod 44 disposed therein for telescopic axial movement relative thereto between a retracted position (FIG. 1), and an extended position (FIGS. 2 and 3). Cylinder body 42 of first lift cylinder 36 has a bottom end 46 fixedly mounted to frame 12 at a first location around basket 18 adjacent to the rear end thereof so as to extend upwardly at a substantially vertical orientation beside rear wall 24. Cylinder body 42 of second lift cylinder 38 has a bottom end 48 fixedly mounted to frame 12 at a second location adjacent to the rear end of basket 18 spaced from the first location, so as to also extend upwardly at a substantially vertical orientation beside rear wall 24 of basket 18. And, cylinder body 42 of third lift cylinder 40 has a bottom end 50 fixedly mounted to frame 12 at a third location around basket 18, adjacent to the front end thereof, so as to extend vertically upwardly beside front wall 26. Rod 44 of first lift cylinder 36 has a top end 52 connected to upper peripheral frame structure 32 of basket 18 at the first location around basket 18, rod 44 of second lift cylinder 38 has a top end 54 connected to frame structure 32 at the second location, and rod 44 of third lift cylinder 40 has a top end 56 connected to frame structure 32 at the third location, such that cylinders 36, 38, and 40 are simultaneously extendable to lift or raise basket 18, and simultaneously retractable to lower basket 18. Top ends 52, 54, and 56 can be connected to frame structure in any suitable conventional manner, such as using pins, bolts, other mechanical fasteners, clamping, or by welding. Importantly, to vertically stabilize basket 18 when lifted, that is, to prevent any substantial lateral movement of basket 18 relative to the direction of lifting movement, which will mostly be vertical or at a small acute angle to vertical, basket 18 includes a plurality of lateral support elements 58 fixedly mounted to bottom peripheral frame structure 22 at the three locations therearound where the fluid cylinders 36, 38, and 40 are located, respectively.

Figure 4:
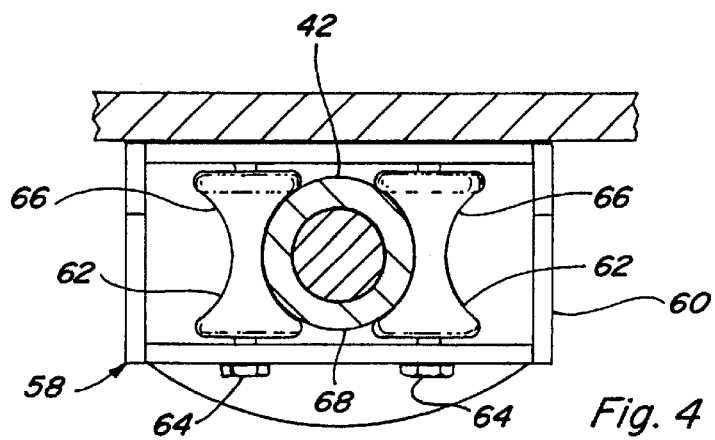
FIG. 4 is a cross-sectional view taken along line 4—4 of FIG. 1 showing a lateral support bracket of the present apparatus.

Referring also to FIG. 4, each lateral support element 58 includes a generally rectangular frame or bracket 60 fixedly mounted to frame structure 22 in any suitable manner such as using bolts, by welding, or the like. Each bracket 60 extends downwardly from frame structure 22 and carries a pair of rotatable rollers 62 on bolts 64 mounted to the bracket 60 and spanning an area defined thereby. Each roller 62 has a curvilinear concave outer surface 66 therearound, the surfaces 66 of each pair of rollers 62 defining a space therebetween having a size and shape substantially corresponding to the cross-sectional size and shape of one of the cylinder bodies 42, for receiving the cylinder body 42 therein such that outer surfaces 66 of the rollers are in intimate engagement or contact with the outer surface 68 of the cylinder body 42. Outer surface 68 of each cylinder body 42 has a continuous extent or length in the lifting or vertical direction at least equal to a maximum height or extent of the lifting movement of basket 18 above or relative to frame 12, shown in FIGS. 2 and 3, such that rollers 62 can roll along and remain in engagement with surfaces 68 throughout the range of the lifting movement of basket 18.

By the fixed connection of cylinder bodies 42 to frame 12, the fixed connection of rods 44 to frame 32 of basket 18, the strength and rigidity of cylinder bodies 42 and rods 44 themselves, and the strength and rigidity of lateral support elements 58 and the rigid attachment thereof to basket 18, the present apparatus 34 substantially limits lateral movement of basket 18 relative to the lifting or vertical direction, throughout the lifting and lowering movement thereof, when basket 18 is positioned at any lifted position relative to frame 12, including the maximum or highest unloading position shown in FIGS. 2 and 3, and when the cotton is being unloaded or moved over open side wall 30. Rollers 62 are capable of smoothly rolling along outer surface 68 of cylinder bodies 42 as basket 18 is lifted and lowered, such that little or no lubrication thereof is needed.

Figure 5:
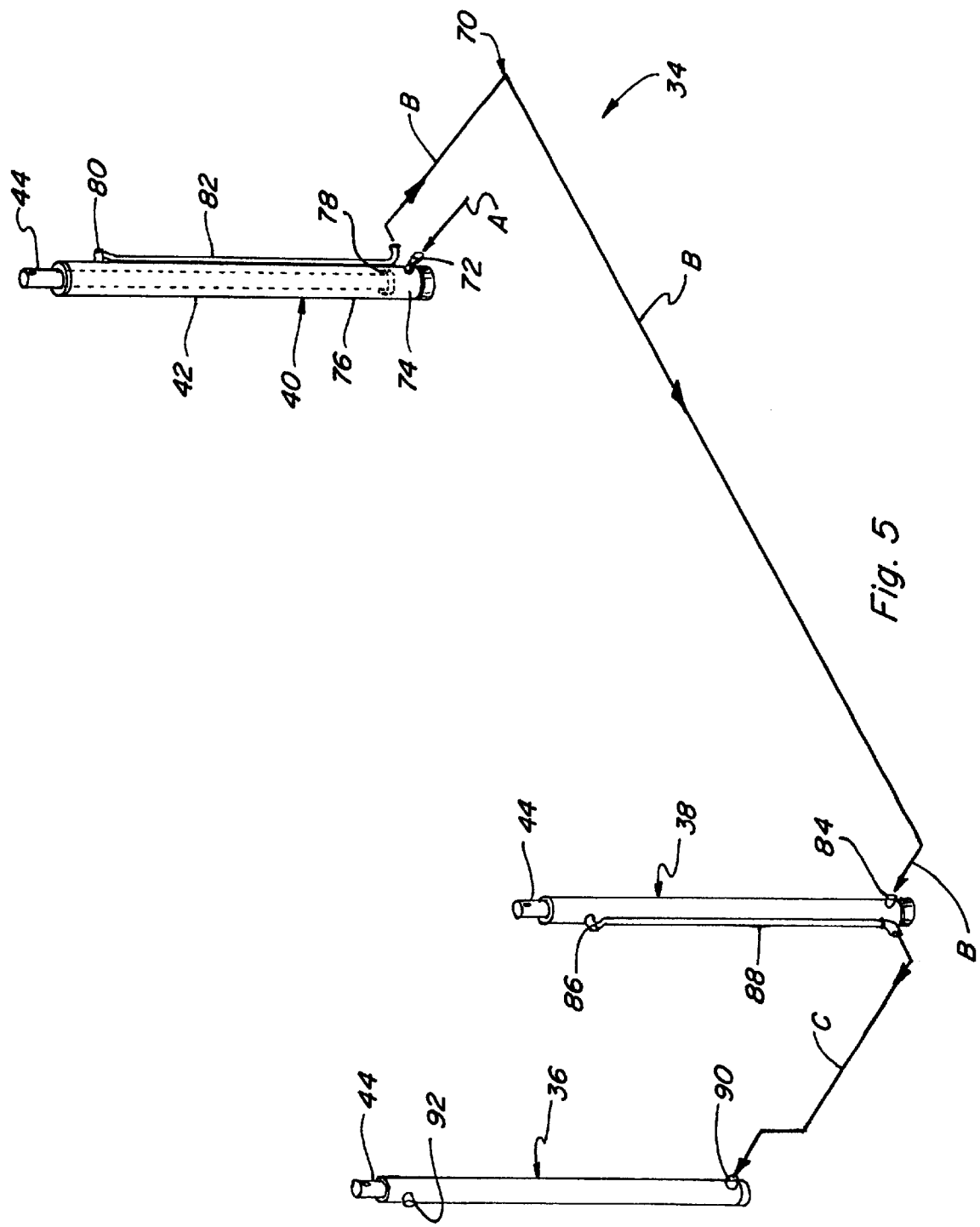
FIG. 5 is a simplified perspective representation showing fluid lift cylinders of the present apparatus and elements of a fluid circuit for supplying pressurized fluid thereto.

Turning to FIG. 5, apparatus 34 includes a fluid control circuit or system 70 connected to fluid lift cylinders 36, 38, and 40, for directing fluid under pressure thereto for simultaneously extending, and simultaneously retracting, rods 44 thereof for lifting and lowering basket 18. Fluid control circuit 70 includes a lower port 72 on cylinder 40, which is a two way cylinder and is denoted as a master cylinder of circuit 70, connectable via a suitable conventional valve, in fluid communication with a source of pressurized fluid (not shown) such as a hydraulic pump or the like on frame 12, and alternatively, to a fluid return line, in the well known, conventional manner. Lower port 72 is connected to, or is part of, a lower cylinder cavity 74 in cylinder body 42 of cylinder 40. Cylinder 40 is structurally representative of cylinder 38, which is also a two way cylinder, and includes an upper cylinder cavity 76 separated from lower cylinder cavity 74 by a piston 78 mounted to the lower end of rod 44 and movable within cylinder body 42 under the force of pressurized fluid introduced to cavities 74 and 76, respectively, for extending and retracting rod 44 in the well known manner. Upper cylinder cavity 76 includes an upper port 80 connected to one end of a fluid line 82, line 82 having another end connected a lower port 84 of cylinder 38 in connection with a lower cavity thereof (not shown). Cylinder 38 is denoted as an intermediate or intermediate slave cylinder of circuit 70. Cylinder 38 has an upper cylinder cavity (not shown) including an upper port 86 connected to one end of a fluid line 88, line 88 having another end connected to a lower port 90 of fluid cylinder 36. Port 90 connects with a cylinder cavity (not shown) of cylinder 36. Cylinder 36 is a one way cylinder and is denoted as a slave cylinder of circuit 70, and also includes an upper port 92 which is plugged. Here, it should be recognized that cylinder 36 could alternatively be a two way cylinder, and upper port 92 thereof could be connected via a suitable conventional valve, in fluid communication with a return line or a source of pressurized fluid (not shown), in the well known, conventional manner to allow powered lowering of basket 18, as desired.

A predetermined quantity or amount of fluid occupies the combined space of upper cylinder cavity 76 of master cylinder 40, the lower cylinder cavity of intermediate cylinder 38, and line 82, and a predetermined quantity of fluid occupies the upper cylinder cavity of intermediate cylinder 38, the cylinder cavity of slave cylinder 36, and line 88. In operation, to lift basket 18, port 72 of master cylinder 40 is connected to the source of pressurized fluid to introduce the pressurized fluid into lower cylinder cavity 74 of master cylinder 40, denoted by arrow A, and drive rod 44 of that cylinder upwardly. This forces the fluid in upper cylinder cavity 76 of cylinder 40 through line 82 into the bottom cylinder cavity of intermediate cylinder 38, denoted by arrows B, to thereby drive rod 44 of that cylinder upwardly simultaneously with rod 44 of cylinder 40. At the same time, the fluid in the upper cylinder cavity of intermediate cylinder 38 is forced through line 88 into the cylinder cavity of slave cylinder 36, denoted by arrow C, to extend the rod 44 of that cylinder. To lower basket 18, port 72 of master cylinder 40 is connected to the return line, to reverse the flow direction of the pressurized fluid.

It should be recognized that in the practice of the present invention, variations of lateral support elements 58 can be used, including, but not limited to, embodiments utilizing greater or lesser numbers of rollers, and/or rollers having other shapes and sizes, and other embodiments, such as including elements which slidingly engage the outer surfaces of the cylinder bodies instead of rolling thereover, without departing from the scope of the invention.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. Apparatus for lifting a cotton receiving basket of a cotton harvester above a frame thereof, comprising:
    a plurality of upstanding fluid lift cylinders disposed at spaced locations around the basket, each of the lift cylinders including an elongate cylinder body having a rod disposed therein and extending upwardly therefrom for longitudinal telescopic movement relative thereto, each of the cylinder bodies including an outer surface having a vertical extent at least equal to a maximum height that the basket is to be lifted above the frame, each of the cylinder bodies being fixedly mounted to the frame and each of the rods being attached to the basket such that when the rods are moved telescopically upwardly the basket is lifted relative to the frame; and
    at least one lateral support element fixedly mounted to the basket and engaged with the outer surface of one of the cylinder bodies for moving therealong in engagement therewith when the basket is lifted for preventing lateral movement of the basket relative to said one of the cylinder bodies.

2. The apparatus of claim 1, wherein the lateral support element comprises a pair of rollers mounted for rotation thereon and defining a space between the rollers having a size for receiving said one of the cylinder bodies such that the rollers will roll along the outer surface thereof in engagement therewith as the basket is lifted.

3. The apparatus of claim 2, wherein each of the rollers has a concave shape surface for engaging the outer surface of the cylinder body.

4. The apparatus of claim 1, comprising three of the upstanding fluid lift cylinders, one of the three lift cylinders being disposed at a location adjacent one end of the basket, and two of the lift cylinders being disposed at spaced locations adjacent an opposite end of the basket.

5. The apparatus of claim 4, wherein each of the first and second lift cylinders have a lower cylinder cavity for receiving pressurized fluid and an upper cylinder cavity for receiving pressurized fluid, respectively, the cylinders being connected such that one of the cylinders is a master cylinder, another of the cylinders is an intermediate cylinder, and another of the cylinders is a slave cylinder, wherein the upper cylinder cavity of the master cylinder and the lower cylinder cavity of the intermediate cylinder are connected and contain a predetermined quantity of fluid, the upper cylinder cavity of the intermediate cylinder and a cylinder cavity of the slave cylinder are connected and contain a predetermined quantity of fluid, and the lower cylinder cavity of the master cylinder is connectable with a source of pressurized fluid for receiving pressurized fluid therefrom for simultaneously extending the rods of the cylinders for lifting the basket.

6. A cotton harvester, comprising:
    a mobile frame;
    a cotton receiving basket having a peripheral portion therearound including a front end, rear end opposite the front end, and spaced sides extending between the front end and the rear end;
    a first extendable fluid cylinder including a first elongate rod mounted for telescopic axial movement relative to a first cylinder body, the first cylinder body having an outer axially extending surface;
    a second extendable fluid cylinder including a second elongate rod mounted for telescopic axial movement relative to a second cylinder body, the second cylinder body having an outer axially extending surface;
    a third extendable fluid cylinder including a third elongate rod mounted for telescopic axial movement relative to a third cylinder body, the third cylinder body having an outer axially extending surface;
    the first cylinder body, the second cylinder body, and the third cylinder body being fixedly mounted to the mobile frame so as to extend upwardly therefrom at spaced locations around the peripheral portion of the cotton receiving basket, the first rod, the second rod, and the third rod being mounted to the cotton receiving basket at the spaced locations, respectively, such that the fluid cylinders can be simultaneously telescopically extended to lift the cotton receiving basket relative to the frame; and
    a lateral support element mounted to the cotton receiving basket and axially movable along the first cylinder body in engagement therewith when the basket is lifted for substantially limiting lateral movement thereof relative to the first cylinder body.

7. The cotton harvester of claim 6, comprising additional lateral support elements mounted to the cotton receiving basket and axially movable along the second and third cylinder bodies in engagement therewith, respectively, when the basket is lifted for substantially limiting lateral movement of the basket relative to the second and third cylinder bodies.

8. The cotton harvester of claim 7, wherein each of the lateral support elements includes a pair of spaced rollers receiving one of the cylinder bodies therebetween.

9. The cotton harvester of claim 8, wherein each of the rollers has a concave surface portion for engaging and rolling along said one of the cylinder bodies when the basket is lifted.

10. The cotton harvester claim 6, wherein the first and second lift cylinders each have a lower cylinder cavity for receiving pressurized fluid and an upper cylinder cavity for receiving pressurized fluid, the cylinders being connected such that the first lift cylinder is a master cylinder, the second lift cylinder is an intermediate cylinder, and the third lift cylinder is a slave cylinder, wherein the upper cylinder cavity of the master cylinder and the lower cylinder cavity of the intermediate cylinder are connected and contain a predetermined quantity of fluid, the upper cylinder cavity of the intermediate cylinder and a cylinder cavity of the slave cylinder are connected and contain a predetermined quantity of fluid, and the lower cylinder cavity of the master cylinder is connectable with a source of pressurized fluid for receiving pressurized fluid therefrom for simultaneously extending the rods of the cylinders for lifting the basket.

11. The cotton harvester of claim 6, wherein one of the lift cylinders is located beside one end of the basket, and two of the lift cylinders are located beside another end of the basket.

12. Apparatus for lifting and supporting a cotton receiving basket of a cotton harvester relative to a mobile frame of the harvester, comprising:

a first extendable fluid cylinder including a first elongate rod mounted for telescopic axial movement relative to a first cylinder body, the first cylinder body having an outer axially extending surface;

a second extendable fluid cylinder including a second elongate rod mounted for telescopic axial movement relative to a second cylinder body, the second cylinder body having an outer axially extending surface;

a third extendable fluid cylinder including a third elongate rod mounted for telescopic axial movement relative to a third cylinder body, the third cylinder body having an outer axially extending surface;

the first cylinder body, the second cylinder body, and the third cylinder body being fixedly mounted to the mobile frame so as to extend upwardly from the frame at spaced locations around the cotton receiving basket, respectively, the first rod, the second rod, and the third rod being mounted to the cotton receiving basket at the spaced locations therearound, respectively, the fluid cylinders being operable to simultaneously telescopically extend the rods thereof to lift the cotton receiving basket relative to the frame; and a first lateral support element mounted to the cotton receiving basket at the first location and having at least one roller for engaging the first cylinder body and rolling therealong as the basket is being lifted, a second lateral support element mounted to the cotton receiving basket at the second location and having at least one roller for engaging the second cylinder body and rolling therealong as the basket is being lifted, and a third lateral support element mounted to the cotton receiving basket at the third location and having at least one roller for engaging the third cylinder body and rolling therealong as the basket is being lifted, the engagement of the lateral support elements with the cylinder bodies preventing the basket from moving laterally relative to the direction of lifting as the basket is being lifted.

13. The apparatus of claim 12, wherein the first fluid cylinder and the second fluid cylinder each have a lower cylinder cavity for receiving pressurized fluid and an upper cylinder cavity for receiving pressurized fluid, the cylinders being connected such that the first fluid cylinder is a master cylinder, the second fluid cylinder is an intermediate cylinder, and the third fluid cylinder is a slave cylinder, wherein the upper cylinder cavity of the master cylinder and the lower cylinder cavity of the intermediate cylinder are connected and contain a predetermined quantity of fluid, the upper cylinder cavity of the intermediate cylinder and a cylinder cavity of the slave cylinder are connected and contain a predetermined quantity of fluid, and the lower cylinder cavity of the master cylinder is connectable with a source of pressurized fluid for receiving pressurized fluid therefrom for simultaneously extending the rods of the cylinders for lifting the basket.

* * * * *